(12) United States Patent
Chen et al.

(10) Patent No.: US 11,509,489 B1
(45) Date of Patent: Nov. 22, 2022

(54) COVERT CHANNEL CONSTRUCTION METHOD IN BLOCKCHAIN NETWORK

(71) Applicant: ZHEJIANG UNIVERSITY, Hangzhou (CN)

(72) Inventors: Yanjiao Chen, Hangzhou (CN); Wenyuan Xu, Hangzhou (CN); Xu Wang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/830,362

(22) Filed: Jun. 2, 2022

(30) Foreign Application Priority Data

Jun. 3, 2021 (CN) .......................... 202110621362.2

(51) Int. Cl.
*H04L 9/40* (2022.01)
*H04L 9/00* (2022.01)
(Continued)

(52) U.S. Cl.
CPC ............ *H04L 9/50* (2022.05); *G06F 16/2379* (2019.01); *H04L 9/3247* (2013.01)

(58) Field of Classification Search
CPC ...... H04L 9/50; H04L 9/3247; G06F 16/2379
See application file for complete search history.

(56) References Cited

U.S. PATENT DOCUMENTS 10,848,308 B2 * 11/2020 Davis .................... H04L 63/062
11,367,065 B1 * 6/2022 Umezurike ........ G06Q 20/0658
(Continued)

FOREIGN PATENT DOCUMENTS

| CN | 112532613 A | 3/2021 |
|---|---|---|
| CN | 112600665 A | 4/2021 |
| CN | 112804046 A | 5/2021 |

OTHER PUBLICATIONS

Song Shang, et al., BLOCCE + : An Improved Blockchain-Based Covert Communication Approach, Journal of Chongqing University of Technology (Natural Science), 2020, pp. 238-244, vol. 34 No. 9.
(Continued)

*Primary Examiner* — Ghodrat Jamshidi
(74) *Attorney, Agent, or Firm* — Bayramoglu Law Offices LLC

(57) ABSTRACT

A covert channel construction method in a blockchain network includes: sharing, by a first terminal and a second terminal, a secret key and transaction information, and generating a blockchain network address by using the secret key and a standard public key address generation algorithm, wherein the transaction information comprises a permutation mapping table and an information capacity of a single transaction; sending, by the first terminal, information by using an information hiding method, and performing simultaneously, by the first terminal and the second terminal, transaction recording; and monitoring, by the first terminal and the second terminal, whether an account transaction of the blockchain network address exists in a blockchain, if yes, extracting, by the second terminal, the information by using an information extraction method, and after extracting the information, replying to the information by using the information hiding method, thereby enabling communication parties to safely transmit information.

4 Claims, 2 Drawing Sheets

(51) Int. Cl.
*H04L 9/32* (2006.01)
*G06F 16/23* (2019.01)

(56) References Cited

U.S. PATENT DOCUMENTS

| | | | | |
|---|---|---|---|---|
| 2003/0188161 | A1* | 10/2003 | Ndiaye | H04L 63/045 |
| | | | | 713/168 |
| 2006/0209843 | A1* | 9/2006 | Zhang | H04L 63/12 |
| | | | | 370/395.32 |
| 2010/0008507 | A1* | 1/2010 | Galante | H04W 12/041 |
| | | | | 380/278 |
| 2018/0294977 | A1* | 10/2018 | Uhr | G06F 21/33 |
| 2020/0406145 | A1* | 12/2020 | Lee | A63F 13/35 |
| 2021/0090072 | A1* | 3/2021 | Sewell | H04L 9/0618 |
| 2022/0050852 | A1* | 2/2022 | Nakajima | H04L 9/3239 |
| 2022/0215038 | A1* | 7/2022 | Feng | H04L 67/104 |

OTHER PUBLICATIONS

Jiang Peipei, et al., Securing guarantee of the blockchain network: attacks and countermeasures, Journal on Communications, 2021, pp. 151-162, vol. 42 No. 1.
Shuangke Wu, et al., CReam: A Smart Contract Enabled Collusion-Resistant e-Auction, IEEE Transactions on Information Forensics and Security, 2018, pp. 1-15.

* cited by examiner

COVERT CHANNEL CONSTRUCTION METHOD IN BLOCKCHAIN NETWORK

CROSS REFERENCE TO THE RELATED APPLICATIONS

This application is based upon and claims priority to Chinese Patent Application No. 202110621362.2 filed on Jun. 3, 2021, the entire contents of which are incorporated herein by reference.

TECHNICAL FIELD

The present invention relates to the technical field of covert data transmission, and in particular to a covert channel construction method in a blockchain network.

BACKGROUND

Covert data communication under a network protocol is mainly divided into two types, one of which is storage-based covert communication with a memory function. This method directly or indirectly uses network equipment to limit the loose storage space, and through elaborate construction, the covert data transmission can be realized by utilizing these fields. The second type is time-based covert communication without a memory function. This method uses the time information of the network protocol packet and achieve covert communication by modulating the time interval between network packets with an algorithm both senders agree on in advance. Such communication does not affect the quality of the communication data, but may use more bandwidth. However, all existing network-based covert communication methods have the disadvantage of being easily detected, monitored and controlled, and the like.

Therefore, to provide a covert channel construction method in a blockchain network so that two communication parties can safely transmit information to each other in a covert channel has become an urgent problem for those skilled in the art to solve.

SUMMARY

In view of this, the present invention provides a covert channel construction method in a blockchain network to solve the problem raised in the background so that two communication parties can safely transmit information to each other in a covert channel.

In order to achieve the above objective, the present invention adopts the following technical solution: a covert channel construction method in a blockchain network, which comprises the following specific steps:

determining, by a first terminal and a second terminal, a secret key and transaction information in advance, and generating a blockchain network address through the secret key and a standard public key address generation algorithm;

broadcasting, by the first terminal, a constructed blockchain transaction into a blockchain network;

monitoring, by the second terminal, whether an account transaction of the blockchain network address exists in the blockchain network; and if information sent by the first terminal is monitored, extracting the information by using an information extraction method, and after receiving the information, acknowledging the information through an information hiding method.

Preferably, the transaction information comprises a permutation mapping table and an information capacity of a single transaction.

Preferably, the information extraction method comprises the following specific steps:

inputting, by the second terminal, the blockchain transaction, the secret key and the permutation mapping table;

reversely deducing partial information through the permutation mapping table and an amount permutation of blockchain transactions; and calculating to obtain covert information through the secret key and an ECDSA digital signature algorithm, and decrypting the covert information to obtain the information sent by the first terminal.

Preferably, the ECDSA digital signature algorithm comprises the following specific steps:

calculating a hash value $h=SHA\text{-}256d(T)$ of the blockchain transaction by a hash function;

selecting a random integer $k \in Z_q$;

calculating a point $(x,y)=[k]G, r=x \bmod q$ on an elliptic curve; and calculating $s=k^{-1}(h+rd) \bmod q$ to obtain a digital signature $(r,s)$ of the blockchain transaction;

wherein, d is the secret key, T is a content of the blockchain transaction, SHA-256d is the secure hash function, and G is a generator of a group of order q.

By adopting the above technical solution, the method has the following beneficial technical effects: the first terminal and the second terminal agree on a common secret key in advance, when the first terminal needs to transmit information to the second terminal, a normal blockchain transaction is sent, and at the time of signing the transaction, a specific value is selected to replace a numerical value which is supposed to be randomly generated, namely, the information is embedded into transaction data through a hiding algorithm. Due to the unique characteristics of the ECDSA signature, other people cannot obtain this specific value by calculation, thereby ensuring the confidentiality of the information transmitted.

Preferably, the information hiding method comprises the following specific steps:

inputting, by the second terminal, the covert information, the secret key and the permutation mapping table:

dividing the information of the blockchain transactions into a plurality of segments, wherein a size of each segment is the information capacity of the single transaction determined in advance by the first terminal and the second terminal;

further coding the information, and sequencing amounts of the blockchain transactions by using the coded information and the permutation mapping table; and selecting the rest information as a random value, and calculating a digital signature to obtain a plurality of unconfirmed blockchain transactions.

By adopting the above technical solution, the method has the following beneficial technical effects: the input and output amounts of general blockchain transactions are not large, so that, on this basis, the present invention continues to expand the capacity of the covert channel through the specific amounts. A simple algorithm is used for coding and decoding the amounts, thereby further expanding the capacity of the covert channel.

Preferably, if the information sent by the first terminal comprises an address update, the secret key is updated as a second secret key, and a second blockchain network address is generated through the second secret key and the standard public key address generation algorithm.

Preferably, the method further comprises the following specific steps:

recording, by the first terminal, a transaction sent by the other party and denoting as $S_A$, and recording, by the second terminal, a transaction sent by the other party and denoting as $S_B$;

maintaining, by the first terminal and the second terminal, $S_A=\phi, S_B=\phi$; and if the first terminal finds that the second terminal is also sending information, performing conflict resolution, and if no conflict occurs, keeping sending the transaction until the information sending is done.

Preferably, the conflict resolution comprises the following specific steps:

comparing currently-maintained transaction set $S_A$ or $S_B$ with transactions in a blockchain network, and finding out the first transaction which is not added into the transaction set and is received by the blockchain network and denoting as a first transaction;

comparing a sequential order of the first transaction and a transaction sent by the present terminal, if the first transaction and the transaction sent by the present terminal are not in the same block, taking the transaction with a smaller block height as a prior transaction, and if the first transaction and the transaction sent by the present terminal are in the same block, taking the transaction that comes before the other one as the prior transaction, and then determining a sender of the prior transaction; and if the first terminal sends the prior transaction earlier, sending, by the second terminal, the transaction after the first terminal finishes sending the prior transaction, and meanwhile, denoting, by the first terminal, the transaction sent by the second terminal as invalid information.

By adopting the above technical solution, the method has the following beneficial technical effects: the problem of concurrent communication is solved by determining the information order for the two communication parties according to the total order of transactions in the blockchain.

As can be seen from the above technical solution, the present invention discloses and provides a covert channel construction method in a blockchain network, which has the following beneficial technical effects compared with the prior art: through the information hiding method and the information extraction method, two communication parties can correctly transmit secret information to each other without any other party being able to sense the existence of the covert channel and to read the information communicated by the two communication parties from the information of the blockchain protocol, greatly improving the safety of information transmission.

BRIEF DESCRIPTION OF THE DRAWINGS

In order to more clearly illustrate the technical solutions in the embodiments of the present invention or in the prior art, the drawings required to be used in the description of the embodiments or the prior art are briefly introduced below. It is obvious that the drawings in the description below are some embodiments of the present invention, and those of ordinary skilled in the art can obtain other drawings according to the drawings provided herein without creative efforts.

DETAILED DESCRIPTION OF THE EMBODIMENTS

The technical solutions in the embodiments of the present invention will be clearly and completely described below with reference to the drawings in the embodiments of the present invention, and it is obvious that the described embodiments are only a part of the embodiments of the present invention but not all of them. Based on the embodiments of the present invention, all other embodiments obtained by those of ordinary skilled in the art without creative efforts fall within the protection scope of the present invention.

Figure 1:
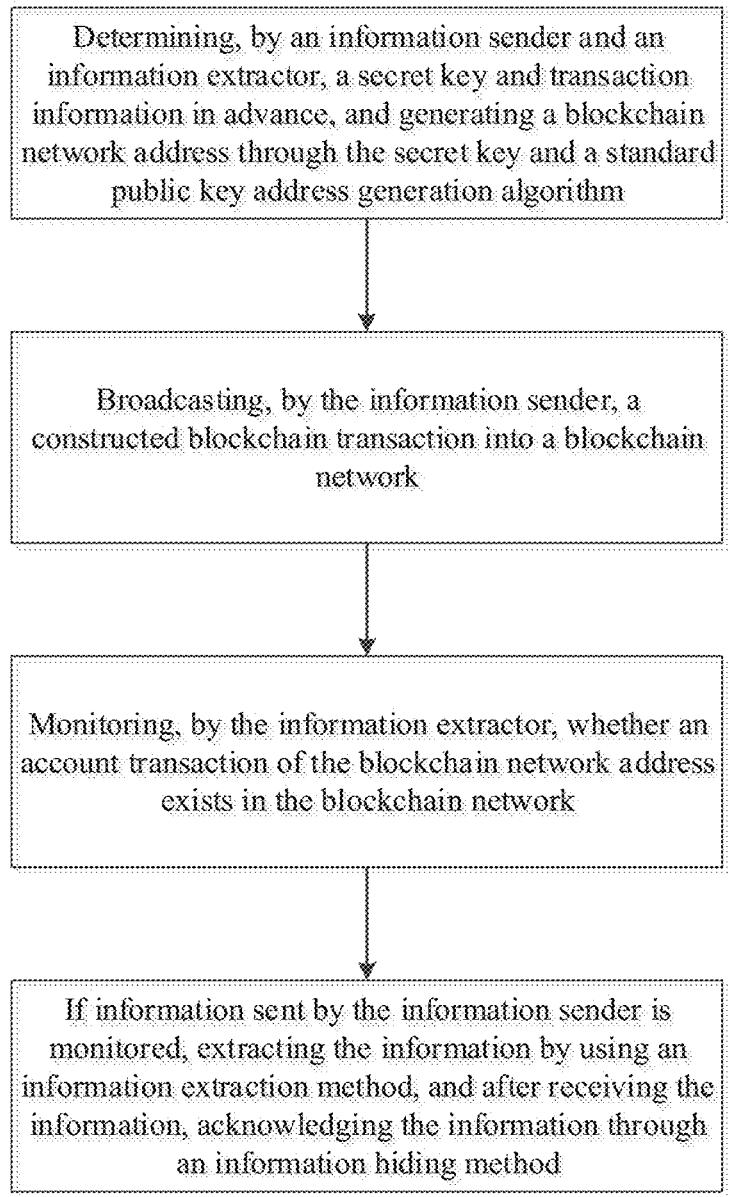
FIG. 1 is a schematic flow chart of the method according to the present invention.

The embodiment of the present invention discloses a covert channel construction method in a blockchain network, which comprises the following specific steps as shown in FIG. 1:

Step I: determining, by a first terminal and a second terminal, a secret key and transaction information in advance, and generating a blockchain network address through the secret key and a standard public key address generation algorithm;

It should be noted that the transaction information comprises a permutation mapping table and an information capacity of a single transaction.

Figure 2:
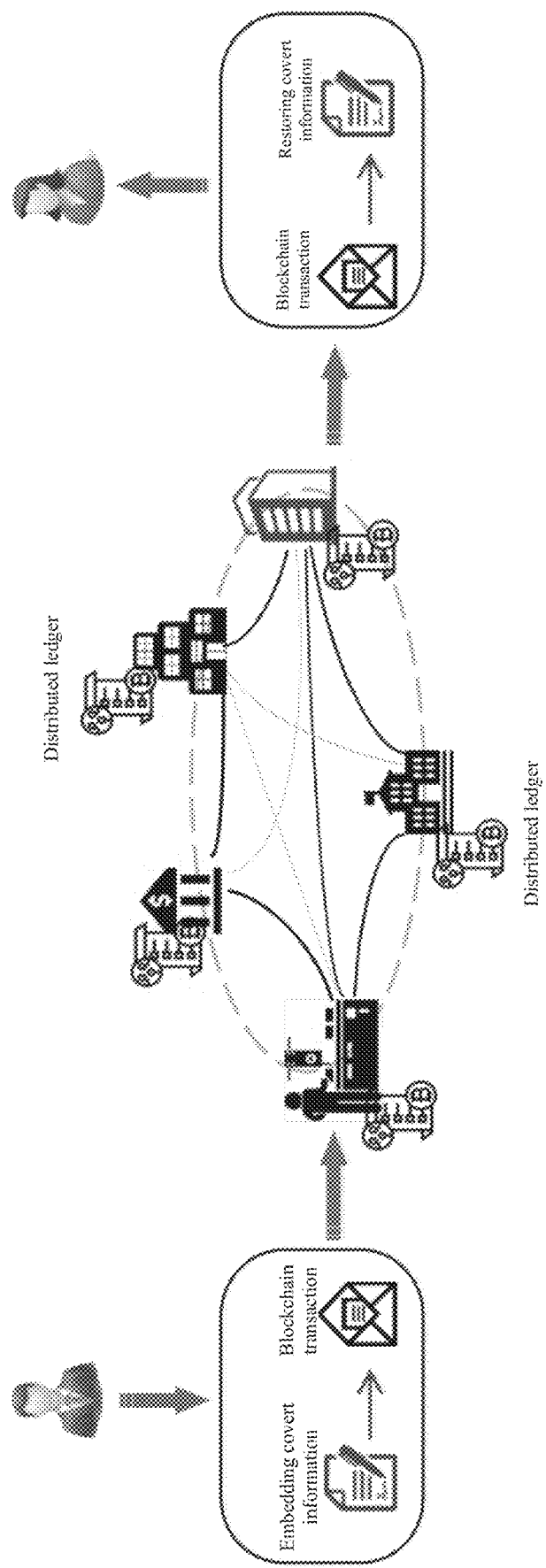
FIG. 2 is a schematic structural diagram of the blockchain transaction transmission according to the present invention.

Step II: broadcasting, by the first terminal, a constructed blockchain transaction into a blockchain network through an information hiding method;

Furthermore, in the blockchain network, each transaction is verified by a valid miner, and a transaction can only be sent to a next miner in a broadcast manner if it is verified as being valid. As shown in FIG. 2, even if the transaction data in a non-standard format are transmitted to the blockchain network, they will be verified as being invalid and discarded by a miner and thus cannot be transmitted to an appointed receiver.

Step III: monitoring, by the second terminal, whether an account transaction of the blockchain network address exists in the blockchain network; and Step IV: if information sent by the first terminal is monitored, extracting the information by using an information extraction method, and after receiving the information, acknowledging the information through an information hiding method.

Furthermore, the information extraction method comprises the following specific steps:

inputting, by the second terminal, the blockchain transaction, the secret key and the permutation mapping table;

reversely deducing partial information through the permutation mapping table and an amount permutation of the blockchain transaction; and calculating to obtain covert information through the secret key and an ECDSA digital signature algorithm, and decrypting the covert information to obtain the information sent by the first terminal.

In the embodiment of the present invention, the digital signature of the blockchain transaction is generated with the involvement of a secure hash function and an elliptic encryption algorithm, wherein the secure hash function provides the excellent one-way mapping property, and meanwhile, an account registration mechanism is not required in a public decentralized blockchain network, providing excellent cover for a covert channel.

Furthermore, the ECDSA digital signature algorithm comprises the following specific steps:

1) calculating a hash value $h=SHA-256d(T)$ of the blockchain transaction by a hash function;

2) selecting a random integer $k \in Z_q$;
3) calculating a point $(x,y)=[k]G, r=x \bmod q$ on an elliptic curve; and
4) calculating $s=k^{-1}(h+rd) \bmod q$ to obtain a digital signature $(r,s)$ of the blockchain transaction;

wherein, d is the secret key, T is a content of the blockchain transaction, SHA-256d is the secure hash function, and G is a generator of a group of order q.

The random integer k cannot be reversely deduced from the digital signature (r,s) unless the secret key d is known. Firstly, the calculation of k through the formula in 3) means that the elliptic curve discrete logarithm problem needs to be solved, which is almost impossible in cryptography; secondly, the calculation of k through the calculation of s in 4) is also impossible, since the secret key d is not known. Thus, anyone who does not know the secret key d cannot obtain a value of k by calculation.

Accordingly, when the secret key d is known, we can calculate k by the following formula.

The formula is $k=s^{-1}(h+rd) \bmod q$.

The above technical solution is established on the basis that both communication parties know the blockchain account address and the secret key, so that all channel information is coded through the only secret key and the account address, thereby increasing the risk to the covert channel. Therefore, a method of updating a new account address and a secret key is needed, and in the method, when a certain transaction has only one input and one output, the information hidden by ECDSA signature is used as a new secret key value, so as to end the communication of the current channel and start communication via a new channel.

Furthermore, the information hiding method comprises the following specific steps:

inputting, by the second terminal, the covert information, the secret key and the permutation mapping table;

dividing the information of the blockchain transactions into a plurality of segments, wherein a size of each segment is the information capacity of the single transaction determined in advance by the first terminal and the second terminal;

further coding the information, and sequencing amounts of the blockchain transactions by using the coded information and the permutation mapping table; and selecting the rest information as a random value, and calculating a digital signature to obtain a plurality of unconfirmed blockchain transactions.

Preferably, if the information sent by the first terminal comprises an address update, the secret key is updated as a second secret key, and a second blockchain network address is generated through the second secret key and the standard public key address generation algorithm.

Furthermore, the method further comprises the following specific steps:

recording, by the first terminal, a transaction sent by the other party and denoting as $S_A$, and recording, by the second terminal, a transaction sent by the other party and denoting as $S_B$;

maintaining, by the first terminal and the second terminal, $S_A=\phi, S_B=\phi$; and if the first terminal finds that the second terminal is also sending information, performing conflict resolution, and if no conflict occurs, keeping sending the transaction until the information sending is done.

Furthermore, the conflict resolution comprises the following specific steps:

comparing currently-maintained transaction set $S_A$ or $S_B$ with transactions in a blockchain network, and finding out the first transaction which is not added into the transaction set and is received by the blockchain network and denoting as a first transaction;

comparing a sequential order of the first transaction and a transaction sent by the second party, if the first transaction and the transaction sent by the present terminal are not in the same block, taking the transaction with a smaller block height as a prior transaction, and if the first transaction and the transaction sent by the present terminal are in the same block, taking the transaction that comes before the other one as the prior transaction, and then determining a sender of the prior transaction; and if the first terminal sends the prior transaction earlier, sending, by the second terminal, the transaction after the first terminal finishes sending the prior transaction, and meanwhile, denoting, by the first terminal, the transaction sent by the second terminal as invalid information.

The embodiments in the specification are all described in a progressive manner, and each embodiment focuses on differences from other embodiments, and portions that are the same and similar between the embodiments may be referred to each other. Since the device disclosed in the embodiment corresponds to the method disclosed in the embodiment, the description is relatively simple, and reference may be made to the partial description of the method.

The above description of the disclosed embodiments enables those skilled in the art to implement or use the present invention. Various modifications to these embodiments will be readily apparent to those skilled in the art, and the generic principles defined herein may be applied to other embodiments without departing from the spirit or scope of the present invention. Thus, the present invention is not intended to be limited to these embodiments shown herein but is to accord with the broadest scope consistent with the principles and novel features disclosed herein.

The invention claimed is:

1. A covert channel construction method in a blockchain network, comprising the following specific steps:

sharing, by a first terminal and a second terminal, a secret key and transaction information, and generating a blockchain network address by using the secret key and a standard public key address generation algorithm, wherein the transaction information comprises a permutation mapping table and an information capacity of a single transaction;

sending, by the first terminal, transaction information by using an information hiding method, and performing simultaneously, by the first terminal and the second terminal, transaction recording; and monitoring, by the first terminal and the second terminal, whether an account transaction of the blockchain network address exists in a blockchain, if yes, extracting, by the second terminal, the transaction information by using an information extraction method, and after extracting the transaction information, replying to the transaction information by using the information hiding method; wherein performing simultaneously, by the first terminal and the second terminal, transaction recording comprises the following specific steps:

recording, by the first terminal, a transaction sent by an other party and denoting as $S_A$, and recording, by the second terminal, a transaction sent by the other party and denoting as $S_B$;

maintaining, by the first terminal and the second terminal, $S_A=\phi$, $S_B=\phi$; and if the first terminal finds that the second terminal is also sending the transaction information, performing a conflict resolution, and if no conflict occurs, keeping sending the transaction information until the transaction information sending is done;

the information extraction method comprises the following specific steps: reversely deducing first information through the permutation mapping table and an amount permutation of blockchain transactions; and on the basis of the first information, calculating to obtain covert information through the secret key and an ElliDtic Curve Digital Signature Algorithm (ECDSA), and decrypting the covert information to obtain the transaction information sent by the first terminal;

the information hiding method comprises the following specific steps:

dividing the transaction information of the blockchain transactions into segments, wherein a size of each segment is the information capacity of the single transaction determined in advance by the first terminal and the second terminal, further coding the transaction information, and sequencing amounts of the blockchain transactions by using the coded transaction information and the permutation mapping table; and selecting a random value, and calculating a digital signature to obtain an unconfirmed blockchain transaction.

2. The covert channel construction method in a blockchain network according to claim 1, wherein the conflict resolution comprises the following specific steps:

comparing a currently-maintained transaction set $S_A$ or $S_B$ with transactions in a blockchain network, and finding out a first transaction which is not added into the currently-maintained transaction set and is received by the blockchain network and denoting as the first transaction;

comparing a sequential order of the first transaction and a transaction sent by a present terminal, if the first transaction and the transaction sent by the present terminal are not in the same block, taking the transaction with a smaller block height as a prior transaction, and if the first transaction and the transaction sent by the present terminal are in the same block, taking the transaction that comes before the other one as the prior transaction, and then determining a sender of the prior transaction; and if the first terminal sends the prior transaction earlier, sending, by the second terminal, the transaction after the first terminal finishes sending the prior transaction, and meanwhile, denoting, by the first terminal, the transaction sent by the second terminal as invalid information.

3. The covert channel construction method in a blockchain network according to claim 1, wherein the ECDSA digital signature algorithm comprises the following specific steps:

calculating a hash value $h=SHA-256d(T)$ of the blockchain transaction by a hash function;

selecting a random integer $k \in Z_q$;

calculating a point $(x,y)=[k]G, r=x \mod q$ on an elliptic curve; and calculating $s=k^{-1}(h+rd) \mod q$ to obtain a digital signature $(r,s)$ of the blockchain transaction;

wherein, d is the secret key, T is a content of the blockchain transaction, SHA-256d is a secure hash function, and G is a generator of a group of order q.

4. The covert channel construction method in a blockchain network according to claim 1, wherein if the transaction information sent by the first terminal comprises an address update, the secret key is updated as a second secret key, and a second blockchain network address is generated through the second secret key and the standard public key address generation algorithm.

* * * * *